July 19, 1966 P. MOSTERT 3,261,755
NUCLEAR REACTOR CONTROL
Filed June 3, 1963
9 Sheets-Sheet 1

FIG.1

INVENTOR.
Pieter Mostert
BY
Cushman, Darby & Cushman
ATTORNEYS

FIG. 2<sup>A</sup>

July 19, 1966 P. MOSTERT 3,261,755
NUCLEAR REACTOR CONTROL
Filed June 3, 1963 9 Sheets-Sheet 9

FIG. 14

INVENTOR.
Pieter Mostert
BY
Cushman, Darby & Cushman
ATTORNEYS

3,261,755
NUCLEAR REACTOR CONTROL
Pieter Mostert, San Jose, Calif., assignor to N.V. Samenwerkende Electriciteits Productiebedrijven, Arnhem, Netherlands
Filed June 3, 1963, Ser. No. 285,104
Claims priority, application Netherlands, June 4, 1962, 279,220
4 Claims. (Cl. 176—22)

This invention relates to the controlling of nuclear reactors and to control means therefor.

The invention is particularly concerned with a nuclear reactor having a core containing nuclear fuel, with tubes or passages situated within this core containing a neutron absorbing fluid.

In conventional reactors of the type mentioned above, control means have been proposed having the purpose of utilizing tubes containing a neutron absorbing liquid not only for the varying of the heat output, but also for the adjusting of the neutron flux distribution within the reactor core. Attempts have been made to reach the object by either varying the density or the chemical composition of the neutron absorbing liquid, or by varying the level of this liquid within the said core.

The use of control tubes in the way described above suffers from several disadvantages.

In the first place, varying the density of the neutron absorbing liquid is a quite complicated matter, in essence requiring the adjustment of the composition of the liquid.

A further disadvantage is that varying of the composition of the neutron absorbing liquid may in practice lead to difficulties. For a trouble-free operation of the reactor it is necessary that the composition of the liquid be such that no unwanted effects of mass transfer will occur and that there will be no corrosion. If a composition is found, having desirable characteristics, it is obvious that it is risky to change the composition.

Another disadvantage of conventional reactors of the type discussed is that a simple variation of the level of the control liquid within the reactor core does not lead to the desired effect of controlling or adjusting the neutron flux distribution within the reactor core at will. The cause of this is that one common liquid level in all the control tubes offers insufficient control possibilities of the distribution of the neutron absorbing liquid.

An object of the invention is to provide reactor control means which will avoid the described disadvantages by controlling in a simple manner the density distribution of the neutron absorbing fluid over the volume of the reactor core.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

To this end, according to the invention the control of the density distribution of the control fluid is attained through designing the control tubes or the control passages within the core in such a way that a multiple branched dense network is formed, with the passage ways chiefly in the vertical direction.

These control tubes or passages can have any cross-section. In the following they are designated as control tubes.

It is possible according to the invention to attain any desired neutron flux distribution, as the only thing one has to do is to take care that the control tube network is most densely branched exactly in those places where the neutron flux distribution needs most to be influenced.

Owing to the homogeneous flux distribution attainable by the aforesaid measures, the fission rods can be loaded uniformly, assuring a maximum output of energy per unit weight of fissionable material and per unit of reactor core volume. Moreover, a uniform rate of fuel burn-up is the result.

To influence the neutron distribution in the desired manner it is sufficient if a suitable neutron absorbing liquid, e.g., mercury, entering the tube network at the underside, reaches liquid levels situated at only a part of the total height of the reactor core, measured from the underside. These liquid levels will in general be different levels, according to their places in the reactor.

By closing the ends of the control tubes at the highest point, where they are protruding through the core, a reliable separation is brought about between the control liquid and the power medium circulating through the reactor.

This power medium can have a pressure as high as 60–140 kg./cm.$^2$, e.g., 100 kg./cm.$^2$, whereas the pressure of the neutron absorbing liquid is never more than about 1.5–8 kg./cm.$^2$, e.g., 5 kg./cm.$^2$. Even in the remote case that a puncture of a control tube occurs, the probability that neutron absorbing liquid will spread through the reactor is very small indeed due to this pressure difference.

A quantity of a chemically inert gas, e.g., argon, may be enclosed in the ends of the control tubes. The height of neutron absorbing liquid in the reactor can now be set at a desired value at any point by balancing the weight of the column control liquid against a variable gas pressure, or by balancing this liquid weight and the pressure of the enclosed non-active gas against the variable gas pressure.

It is sufficient, if every control tube or some of the interrelated control tubes are brought in communication with a control column. Inside this control column the liquid pressure is placed at a desired value, e.g., by means of a gas of variable pressure acting on a liquid level in the control column. In this way, the reactor can be controlled by making use of the counter-pressure of the argon in the control tubes.

Special measures, however, will be needed in most cases to take care of the expansion effect of this gas, caused by the temperature variations. If the negative temperature coefficient of the reactor is inadequate to compensate for this effect, then compensation can be obtained by the choice of a low pressure inside the control tubes.

Making the liquid level of any control tube inside the reactor always higher than the corresponding liquid level outside the reactor has the effect of requiring a control pressure of the gas above the liquid level in the control column, which is always higher than the gas pressure inside the closed ends of the control tubes. A desirable pressure of the gas in the control column is around 2 kg./cm.$^2$. If the maximum counter-pressure in the control tubes is about 30 cm. Hg, the variation in this pressure is in the order of 1 mm. Hg. Temperature effects on the liquid level then become negligible, particularly if the volume of inert gas enclosed is kept small.

By varying the pressure on the liquid level in a control column, the liquid level in the corresponding control tube can be set at the desired value without any difficulty.

The inert gas, e.g., argon, enclosed in the control tube ends serves the purpose of cushioning the shock of the control liquid against the tube ends, when a "scram" is necessary.

Sticking of the control liquid against the tube ends when the reactor again is made critical, is also obviated by the presence of the gas in the control tube.

As the control liquid, e.g., mercury, never rises as high as the end of a control tube because of the gas filling the end, the ends of the control tube are preferably left protruding from the reactor core. Hence, it is possible for the mercury levels inside the core to reach into the upper position of the top boundary level of the reactor core.

The multiple branched network of control tubes inside the reactor can be of such a nature, that the number of tubes running in a vertical or almost vertical direction, inside the core, in a horizontal cross-section over the core, remains constant, if this cross-section is moved from the underside of the core to the top side. However, in some cases it may be advantageous for the number of tubes cross-sected to be augmented upon such movement of the cross-section. In another embodiment, it is of advantage for the number of cross-sected tubes to first increase and thereafter diminish or vice versa.

All these different methods to deploy and branch-off the control tubes can be used to influence the neutron flux distribution in special places.

A limited number of tubes can penetrate the wall of the reactor vessel, preferably in those places where the construction permits it to be done conveniently.

An advantage of this type of construction is that all moving parts may be placed outside the reactor vessel and hence easily attainable for inspection and the normal maintenance and replacement of parts.

In special cases it is advantageous to place the control tubes inside the core 1 at an acute angle with the vertical direction or following a pattern of stream-lines in the power fluid. It is also possible to give the control tubes the form of a spiral or helix, vertically situated, winding itself around one or more fission rods.

In a preferred embodiment of the invention, the control tubes, by the process of branching-off from the feeding tubes which penetrate the wall of the reactor vessel, are so far subdivided, that in a horizontal cross-section over the core, a pattern repeats itself, wherein a number of control tubes is surrounded by fission rods.

Within this pattern, the number of control tubes in proportion to the number of fission rods is between 1:2 and 1:4 inclusive, at least if both control tubes and fission rods are of about the same diameter. A number of control tubes, running in parallel directions close together, may be welded together, to obtain a bundle of control tubes, e.g. a flat bundle.

It is also possible to employ flat tubes, having partitions or other reinforcements internally which make the apparatus stronger against collapsing pressures. For reactors employing these kinds of tubes and fission rods of any cross-section, the proportion between the integrated surfaces of the control tube cross-sections and the integrated surfaces of the cooperating fission rod cross-sections should be between 1:2 and 1:4.

Constructions having flattened control tubes are not advisable in reactors operating with a high pressure of the cooling medium. For pressures in the order of 60–140 kg./cm.$^2$, e.g. 100 kg./cm.$^2$, with a pressure inside the control tubes of only a few atmospheres, e.g. 10 kg./cm.$^2$, a flat, not reinforced tube, capable of sustaining this outward pressure is hardly practical.

When each tube penetrating the wall of the reactor vessel communicates with a corresponding control column, a governing system is established giving an absolute control over the individual liquid levels of the neutron absorbing liquid in the several control tubes.

To be able to vary the gas pressure in every control column, the columns are connected to a common control pressure vessel. In the connecting pipes are interposed dosing means, allowing the admission of measured quantities of the control gas, every time the dosing means is operated.

Another gas pressure vessel, containing gas of much higher pressure, hereafter called the "scram" vessel, can be hooked up to the control pressure vessel over a pressure reducing valve. It is still better to supply both the "scram"-vessel and the control pressure vessel directly with gas, e.g., argon, under pressure from a gas compressor.

By simultnaeously connecting all control columns with the "scram"-vessel, the neutron absorbing liquid swiftly mounts in all control tubes inside the reactor core to the highest liquid level, thereby breaking off the fission reaction. The "scram"-vessel thus acts as a safety control.

It is also possible, to connect the control tubes along a single control pipe with only one control column. In this case, the control tubes are designed in such a way, that the control liquid in the reactor core will still mount in different tubes to different heights under impulse of the gas pressure in the control column.

This effect can be accomplished by giving the ends of the control tubes different volumes, e.g., by using control tubes having identical cross-sectional areas but having different lengths. By this difference in the gas cushioning effect, the liquid levels in the control tubes can be made to change according to any desired relationship.

According to a special embodiment of the invention, it is even practicable to include in the control column (or columns) an elastic membrane, and preferably a metallic membrane, having the gas side thereof connected to the reactor circuit of the cooling medium. The membrane column (or columns) can also be situated inside the reactor vessel. In this latter case it is unnecessary to penetrate the wall of the reactor vessel by control pipes.

In all the above described embodiments the control fluid to be used in the control tubes is preferably a liquid metal, or mixture of metals, i.e., an alloy, because these are not liable to radiation destruction and do have a low vapor pressure. Examples of such metals include mercury and slurries of neutron absorbing solids in liquid sodium or sodium-potassium alloys.

The vapor pressure for these metals is low enough to enable the pressure inside the control tube system to be kept at a moderate value.

Mercury is particularly advantageous for use as this metal because it (a) stays in liquid form even at room temperature, (b) has a good absorption of thermal neutrons, and (c) does not give serious rise to decay products having long-term radio-active effects.

Bearing this in mind, preferably mercury and compositions containing mercury are used.

Thallium is advantageously employed in an amount of up to 20 atom percent, admixture with mercury. Like mercury it has a low melting point, specifically 30° C. Thallium has a high capacity for the absorbing of neutrons, especially in the epithermical region around 100 electron volts where the neutron absorbing qualities of mercury are strongly diminished.

Another metal which can be used with mercury is cadmium, although this heightens only the obsorption of thermal neutrons. Cadmium can be used in an amount of up to 15 atom percent with the mercury.

By adding 10 atom percent cadmium, the thermal neutron absorbing cross-sections are doubled. All compositions in the specification and claims are given in atom percentages.

For a reliable operation of the reactor it is necessary that the material of the control tubes is not corroded by the control liquid employed.

In these cases where the control tubes are made from stainless steel, small quantities of titanium and magnesium can be added, e.g. about 0.01% titanium and 0.001% magnesium.

These additions counter any tendency toward mass transportation in the control system and at the same time serve as a wetting agent for the interior walls of the tubes.

The invention will be best understood in connection with the drawings wherein:

FIGURE 2 and sub

Figure 1:
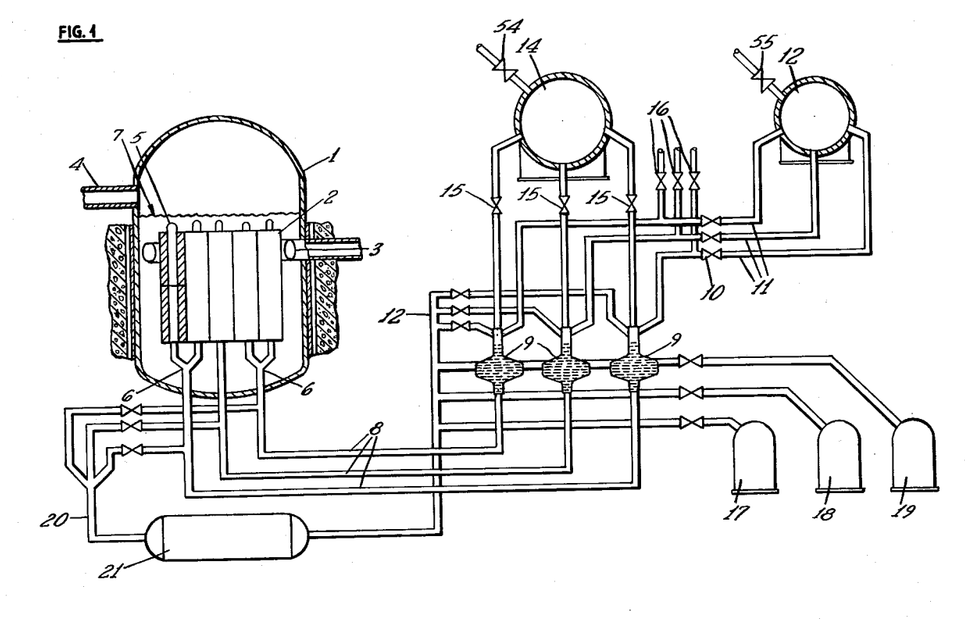
FIGURE 1 is a schematic lay-out of the reactor control system, with the connections between the control columns, the control pressure vessel and the "scram"-vessel.

Referring more specifically to the drawings, in FIGURE 1 the wall of the reactor vessel is denoted by 1, while 2 indicates the reactor core. Within the core are situated control tubes 5, which are closed at the upper end. At the underside these tubes come together in branching-off points 6. The reactor shown by way of example is either of the boiling water or of the pressure water type. In the first case, the level of the cooling medium is at 7. However, the invention is not limited to these reactor types and can be employed equally well with all those reactor types using control rods having neutron absorbing properties. Water is admitted within the reactor vessel through pipe 3, while the steam produced or the heated water is carried off through pipe 4 in the upper part of the reactor.

The fuel elements, e.g. having 36 fuel pins and vertical passages between them permitting the free flow of the cooling medium, water in this case, together form the reactor core 2. Pipelines 8 connect the control tubes 5 with a number of control columns 9. Preferably these control columns have such a form (see FIGURE 5), that the part coupled to the control pipeline, has over a small part of the control column a much larger diameter than the rest of the control column, situated above this wider part. Thus the diameter of the wide portion can be e.g. 10 times the diameter of the rest of the control column. In the widest part a quantity of control liquid is kept, that corresponds to the volume of liquid required to fill up the control tubes to the highest level under "scram"-conditions (i.e. safety or shut down conditions). Above the liquid level in these control columns gas can be admitted by operating the valves 10, positioned in the pipelines 11. As these pipelines are connected to control pressure vessel 12 the gas pressure in a control column can be set at any desired value, e.g. 2 kg./cm.$^2$.

Control pressure vessel 12 receives gas having a constant pressure. The "scram"-vessel is likewise kept under a much higher pressure, e.g. 10 kg./cm.$^2$ by a compressor-plant (not shown) feeding the vessels through non-return valves.

By means of a number of valves or cocks 15 it is possible to submit all the control columns 9 suddenly to the maximum "scram"-pressure out of vessel 14.

Figure 10:
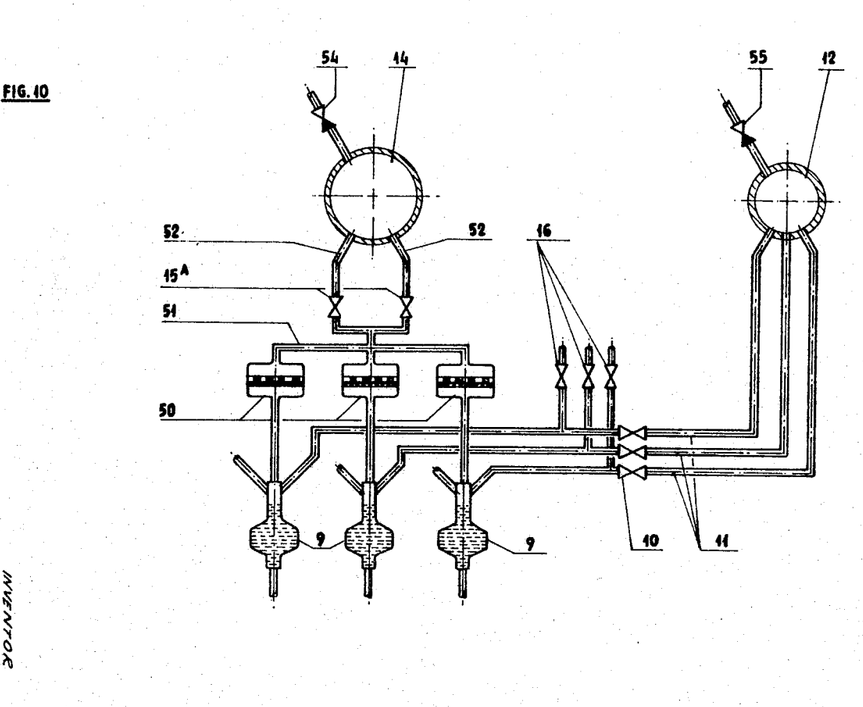
FIGURE 10 illustrates an alternative layout of the control system shown in FIGURE 1.

A preferred embodiment for connecting the "scram"-vessel 14 to the control columns is shown in FIGURE 10. The control columns 9 are here connected to the "scram"-vessel through two valves or cocks 15a functioning independently from each other in parallel pipelines 52. Connected to pipelines 52 are pipes 51 which branch off to the different control columns. In every pipe 51 is interposed a burst or break diaphragms 50, designed so that the diaphragm at the side of the "scram"-vessel is sustained by a gas-permeable partition, e.g. a grid. In this way the gas pressure in every control column can for control purposes be set at a different value, whereas it still is possible, by opening of only one of the valves 15a, to put the whole reactor under "scram" conditions. The diaphragms 50 are sufficiently weak to burst under the influence of the high pressure of the gas flowing from the "scram"-vessel and will thus admit this gas to the control columns.

When this happens, the liquid levels in the control tubes 5 will be pressed so strongly upwards, that within the core of the reactor in every control tube these levels will coincide with the upper boundary of the core. In a safe and reliable manner the fission reaction will thereby be stopped.

For normal control purposes and with the object of re-adjusting the neutron flux distribution, however, only the flow control means 10 are manipulated. These can be valves or cocks, but it is advantageous to use gas-dosage-means, e.g. with push-buttons, operating in such a way that whenever an increase in pressure is wanted a push-button is pressed and a measured quantity gas out of the pressure vessel 12 is admitted into the control column.

Likewise the control column 9 can be submitted to a pressure relief, by using valves or dosage means 16 for the release of gas out of the control columns to a space having a comparative low pressure.

The reservoirs 17, 18 and 19 contain the liquid metals and additives employed for obtaining the control liquid.

After the reactor has been carrying a power-load for some time, it may be necessary to refine the control fluid. To this end the control liquid can be drained off through a pipe 20 leading to a refining plant 21 which at the same time serves as a hold-up storing tank. This tank has enough room to store the control liquid needed for a time of 10 days, at which time the radioactive rays of the $^{196}Hg$ present will have fallen off to a safe value. The refined control liquid can be returned to the control columns 9 by pipeline 22 which contains valve or other means to permit addition of extra components to the control liquid.

Figure 2:
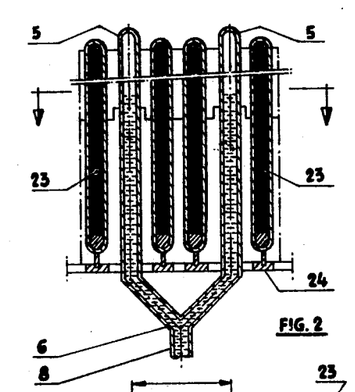
Figure 2A:
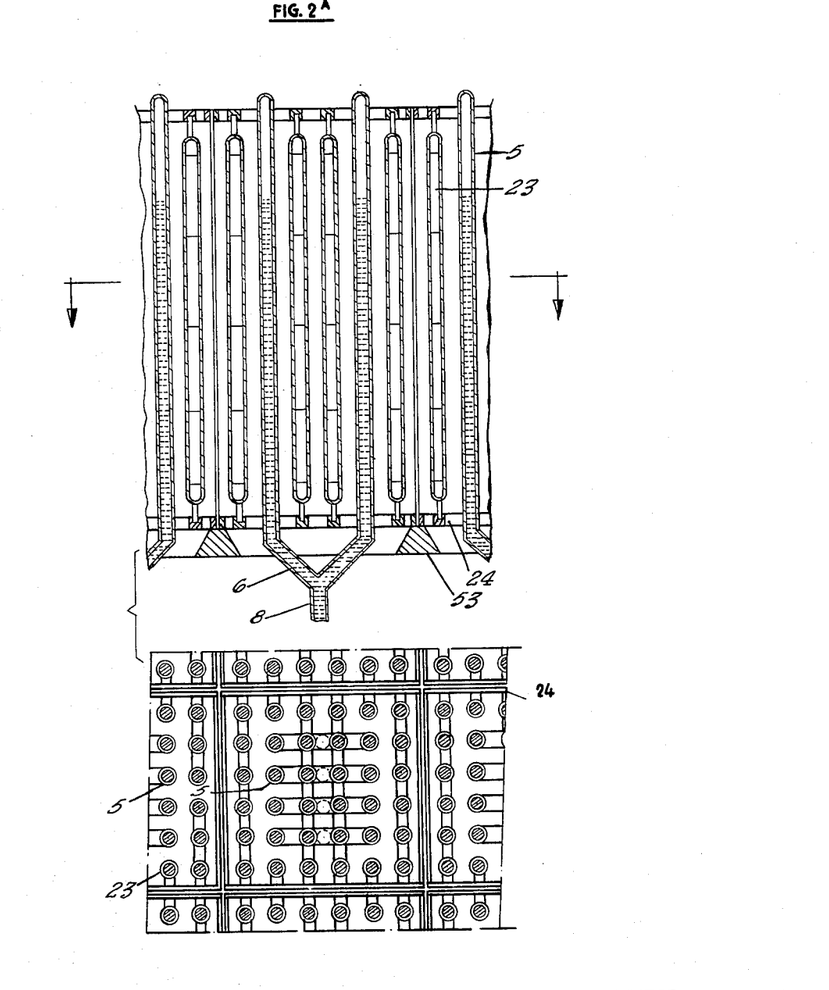
FIGURES 2A through 2E show vertical and horizontal cross-sections over a number of control tubes.

FIGURE 2 shows in A a vertical section through an element of a pressurized water reactor. Here also the control tubes are indicated by 5, whereas 23 denotes the vertical fission rods, sustained at the underside by a grid 24.

Before the control tubes 5 are connected to the control pipe 8 penetrating the wall of the reactor vessel the control tubes converge at 6.

Figure 2B:
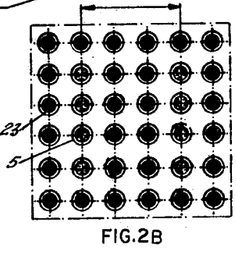
Figure 2C:
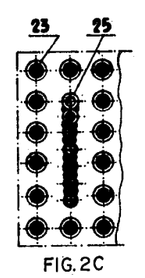
Figure 2D:
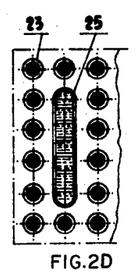

The horizontal cross-section FIGURE 2B shows that it is easy to design a pattern repeating itself in which 4 control tubes are surrounded by, at the most, 14 fission rods. However, it is also possible to design the pattern in another way, giving the even more favorable result of FIGURE 2C which is advantageous in those cases where it is necessary to encompass the control of a wider power range.

In this case the ratio of the number of control tubes to the number of fission rods is between 1:2 and 1:4.

Figure 2E:
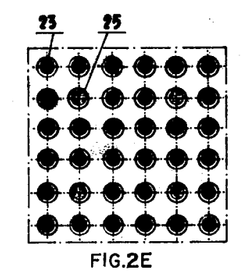

In FIGURE 2E there is shown a core pattern in which the ratio of the number of control tubes to the number of fission rods is about 1:8.

FIGURE 4 shows quite clearly, that the new method of control allows a much smaller reactor vessel, resulting in an appreciable capital saving.

Figure 4A:
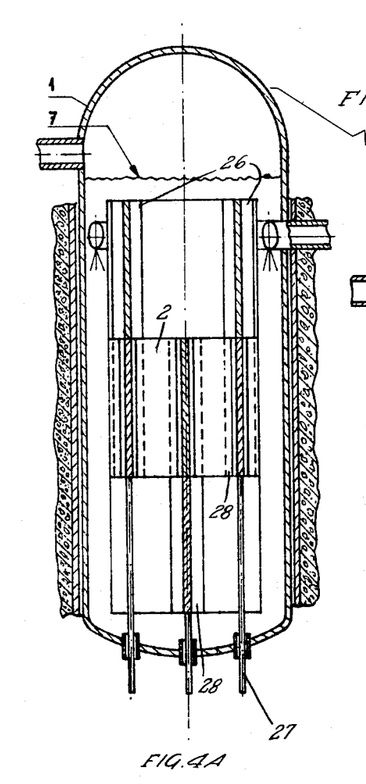
FIGURE 4 shows the saving in the height of the reactor vessel obtained by using the control method of the invention.

FIGURE 4A is a drawing of a control system of the conventional type. Here within the core 2 rods 26, fashioned of a material having good neutron absorbing capabilities, are adjusted by actioning rods 27 along vertical direction.

In water cooled and moderated reactors the withdrawn neutron absorbing rod is replaced by water. The effect is that exactly in this region an over-moderation is produced, with the result that the neutron flux curve as well as the temperature curve becomes as indicated by curve $t$ in FIGURE 3.

Figure 3:
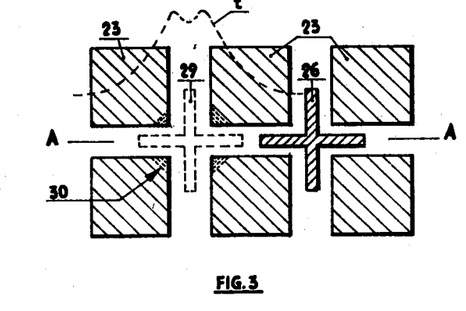
FIGURE 3 illustrates the temperature rise occurring when a control rod is withdrawn according to the conventional method of control.

The total reactor power is limited by the local peaks in the power density. Hence, it is important to keep these temperature peaks as low as possible. This may be done by fixing "followers" 28 to the end of the neutron absorbing rods. But this also makes it necessary to give the reactor vessel a corresponding extra length.

As the control tubes of the present invention do not possess control mechanisms having a replacement by water, as is required by the movable control rods, this problem occurs to a far lesser degree.

The properties of the control tubes may be influenced so that no local peak in the power density occurs above the level of the control liquid in a reactor control tube. This requires a special choice of the material of the control tubes, in some cases combined with separate rods of different material, placed in the center of the control tubes. Depending on the moderating effect that is wanted the material for these rods will have slight neutron absorbing capacity or only neutron scattering effect. Thus, the control tubes can be made of stainless steel.

FIGURE 3 shows the problem which occurs with conventional system of the type of FIGURE 4A. In this drawing 23 is a fission element, while 26 indicates a control rod, placed in braking position between the fission rods. As soon as this control rod is entirely withdrawn from between the fission rods, an overmoderated condition takes effect around 29. Because of this, the temperature distribution along the line AA takes the form of a temperature curve $t$.

The parts 30 of the fission rods are thereby exposed to an undesirable high temperature. It is true, that this need not be the case if followers 28 are employed (see FIGURE 4A), but, as stated, this results in a reactor vessel of extra length.

Figure 4B:
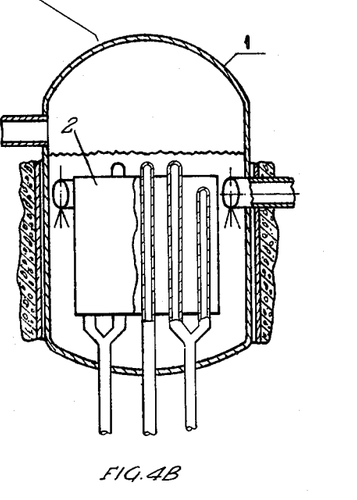

FIGURE 4B in contrast shows a reactor employing control tubes according to the present invention. It is clear from FIGURE 4B that space need not be reserved either above or under the reactor core for holding the control rods.

Figure 5:
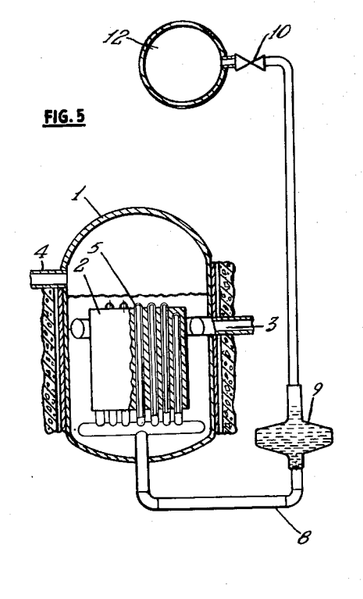
FIGURE 5 illustrates a control system having control tubes protruding at different lengths out of the reactor core.

In FIGURE 5, the control tubes 5, having closed ends filled with a chemically inert gas, e.g. argon, are of different length.

All control tubes in this embodiment are connected to a common control pipe 8, communicating with control column 9. The latter can be subjected to a desired control gas pressure by manipulating valve 10 at the outlet of pressure vessel 12.

Figures 6, 7:
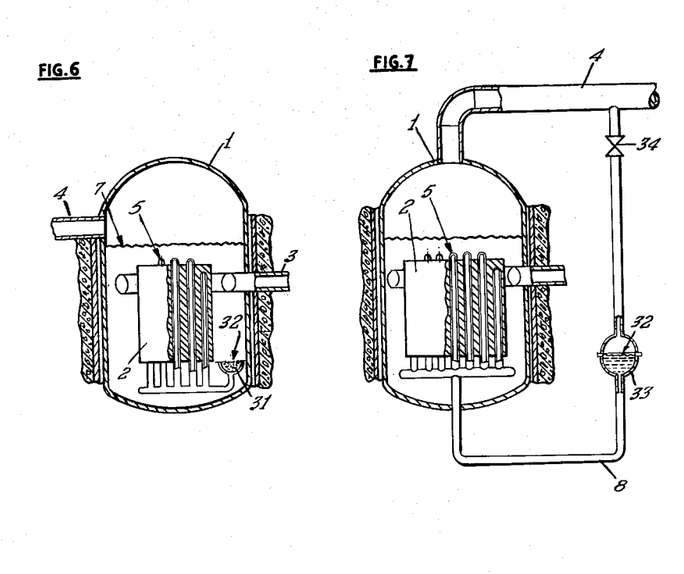
FIGURE 6 shows a control column adapted with an expansible membrane, situated inside the reactor vessel.
FIGURE 7 illustrates a control column as shown in FIGURE 6, but connected to the cooling fluid circuit of the reactor.

FIGURE 6 shows a construction, wherein all control tubes 5 are communicating with a common control column 31. In this case the control column 31 is supplied with an elastic membrane 32 made of e.g. stainless steel, on the outside of which is working the pressure deployed inside the reactor vessel. If the pressure in this vessel rises to an undesired height, the pressure under membrane 32 becomes so high, that within the control tubes 5 the liquid levels rise to the maximum attainable level, against the gas cushioning pressures in the closed tube ends.

FIGURE 7 shows a slightly different form of the invention whereby the control column 32 is situated within a membrane pot 33, connected by means of a control valve 34 with the pipeline 4 carrying the steam, produced in the reactor.

In FIGURE 8 a number of different designs for interbranching control tubes are schematically presented.

Figure 8A:
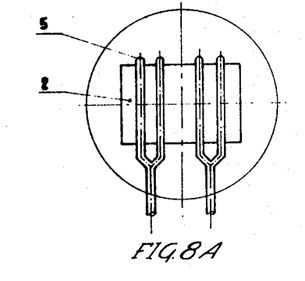
FIGURE 8 shows different methods for interbranching the control tubes.

FIGURE 8A shows control tubes 5, staying the same in number, along the whole height of the reactor core 2.

Figures 8B, 8C:
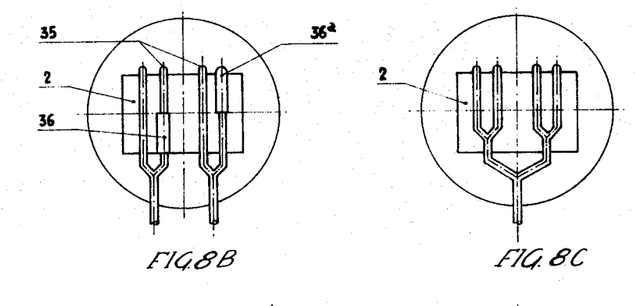

In FIGURE 8B this is also the case, but some control tubes 35 possess a different tube diameter for a certain length of tubing eg., 50% of the tubing length. In the drawing this is exemplified by the tube length 36 and 36a having a larger diameter. As a result, with the same tube wall thickness in these parts, the tubes will contain more neutron absorbing liquid than in other parts. In this way it becomes possible to exert a stronger influence on the neutron flux. If need be, parts of the reactor core which are undermoderated, as for instance the upper part of a boiling water reactor, can be supplied with control tubes 36a having extra width.

FIGURE 8C shows a schematic layout wherein the control tubes branch off within the reactor core as well.

Figure 8D:
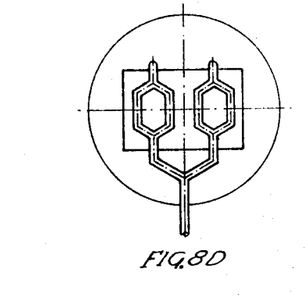

FIGURE 8D exemplifies the fact that it is possible later on again to connect these tubes with each other.

Figure 8E:
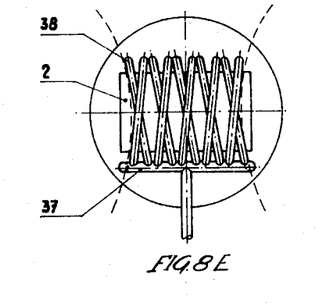

FIGURE 8E gives an example of a reactor type employing straight tubes erected at an elevational angle with the vertical. These tubes at the underside are connected to a circular tube 37.

If the tubes 38 are fixed in this case at the same angle with the vertical, the axis of all these tubes will be contained within a single bladed foil of an hyperbolic surface of revolution.

Figure 8F:
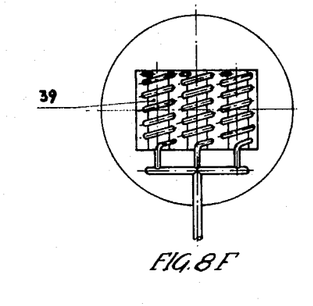

FIGURE 8F is a schematic drawing of control tubes wound as spirals or helixes around fission rods 39 situated therewithin.

Figure 9:
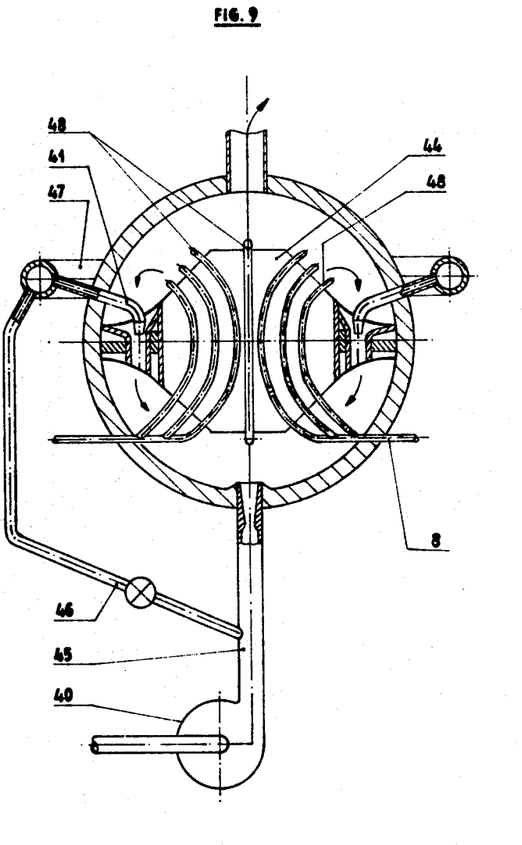
FIGURE 9 shows a vertical cross-section over a pressure water reactor with internal recirculation.

FIGURE 9 shows a modification of a type of pressurized water reactor, described in the Belgium Patent No. 612,640, FIGURE 7. In this reactor there is employed the principle of recirculation of the cooling fluid. A forced internal circulation of this kind has a favorable influence on the heat extraction. It is very attractive to employ this solution for reactors supplied with control tubes, because such tubes leave both the upperside and the underside of the reactor core sufficiently free from obstructing control mechanisms to allow an unrestricted fluid flow.

To this end for instance a number of jet pumps 41 can be utilized, to recirculate part of the pressurized water, after it has been heated within the core 44, back to the underside of the reactor core. This return stream mixes with the fresh cooling medium, admitted to the reactor vessel by inlet 45. A circulation pump 40 is employed to transport this cooling fluid.

A part of this cooling medium, given the slightly higher pressure needed to operate the jet pumps, flows through pipe 46 out of pipe 45 to a circular pipe 47, supplying pressure medium to the jet pump 41.

In order to render the resistance encountered by the ensuing liquid vortex as low as possible, the passages in the reactor core for the cooling fluid are adjusted along the stream-lines of a toroidal free vortex.

The control tubes 48 are positioned in such a way, that they run parallel with the cooling passages (not shown).

As described above, the control tubes 48 communicate by means of control pipes 8 with control columns such as the control columns 9 of FIGURE 1.

Not only the fission elements but also the cooling passages and the control tubes can be oriented so that the axes thereof are situated within concentrically disposed hyperbolical surfaces of revolution.

This can be done as exemplified in FIGURE 9, or the elements, passages and tubes can follow straight lines, lying on these same surfaces of revolution.

Figure 11:
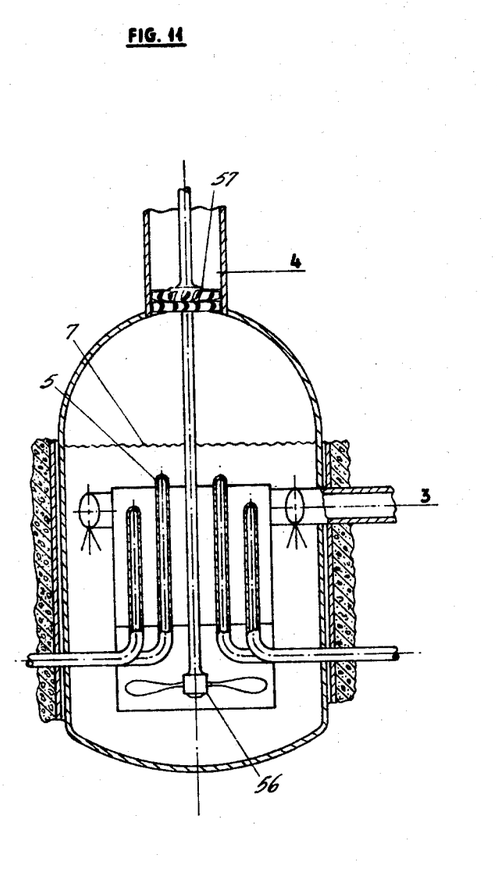
FIGURE 11 shows an alternative form of the reactor shown in FIGURE 9, for a reactor with internal recirculation by means of a pump impeller driven by the power medium produced in situ.

Although in the drawing the recirculation takes place by means of jet pumps, the invention is not limited thereto. If the point at which the control tubes enter the reactor vessel is not situated at the underside of the reactor, it is feasible to mount a pumping impeller 56, as shown in FIGURE 11, at this spot, for the internal recirculation of the cooling medium. By this means the heat extraction per liter reactor volume can be heightened appreciably. In a boiling water reactor the pump can be driven by steam produced locally, e.g. by steam turbine 57.

Mercury is a very suitable control liquid for use in the invention not only because of its metallic character, which makes it invulnerable to radiation damage, but also because of its low melting point. Additionally, the vapor pressure is sufficiently low at the temperatures employed. Moreover, mercury does not become strongly radioactive by the neutronic radiation.

Mercury produces after exposure to radiation two radioactive isotopes $^{203}$Hg and $^{205}$Hg. The latter has a half life of 5.5 minutes and so decays extremely fast. At the same time it is only a $\beta$-emitter and hence needs no shielding.

The $^{203}$Hg formed out of the $^{202}$Hg has a much longer half life, viz. 46.5 days. Except for $\beta$-radiation it emits also a rather soft gamma radiation (0.28 m.e.v). The activation cross-section of $^{202}$Hg is 3.8 barn and the occurrence of the isotope in natural mercury is 29.8%. After 130 days $^{203}$Hg attains the saturated activity. This is about 100 Curie/cm.$^3$ in a flux of $10^{14}$ n./cm.$^2$ sec. By reason of the flux depression in the mercury and the average lower flux, the mean value in the reactor obtained is not more than 5 Curie/cm.$^3$ Hg. At the outside of the reactor this concentration is still lower, so that this soft gamma radiation is easy to cope with.

Finally it is still possible to vary the neutron absorbing properties of the mercury, in the thermical as well as in the epithermical region.

In the thermical region a mixture of Hg and Cd can be considered.

The composition of this mixture, consisting of Hg with Cd will depend on:
a. The absorption desired
b. The working temperature.

A mixture of Hg with 10 atom percent Cd is still fluid at room temperature and has a very high absorption of thermical neutrons.

At higher temperatures the concentration of Cd can be raised higher, e.g. as high as 70% for a temperature of 250° C.

The effect of high thermical absorption can be heightened by adding resonance absorbers such as indium or gallium, in combination with mercury and cadmium. If stainless steel tubes are employed, then mass-transfer effects can be countered by addition of 0.00 to 0.012% magnesium, while an addition of 0.000005 to 0.001% titanium has the effect of assuring a good wetting of the tube wall by the mercury.

The thallium and indium can be used in an amount of 0 to 20 atom percent of the mercury, depending on the point reached in the fuel cycle in the mercury-cadmium thallium or mercury-cadmium-indium composition while the cadmium is present in an amount of 0 to 15 atom percent, of the mercury.

When 70 atom percent of cadmium is added to the mercury to make up the control liquid, then the result is a liquid having a melting point of 225° C.

If a control liquid with a still lower melting point is wanted, then it is necessary to decrease the quantity of cadmium, e.g. so that it is between 30 and 40 atom percent.

A control liquid staying in liquid form at room temperature is preferably used. This is the case, for example, if mercury is used to which 10 atom percent cadmium is added. The same favorable effect as to the low melting point is established with a control liquid composed of mercury together with 8 atom percent thallium and 20 atom percent cadmium. In this case, the control liquid stays fluid at room temperature in spite of the high cadmium content. The absorption capacity for neutrons is increased 50% relative to the absorbing power of a control liquid composed of mercury containing 10% cadmium. The control liquid made up of mercury, thallium and cadmium accordingly has a neutron absorbing capacity that is three times as much as straight mercury.

If a control liquid is prepared by adding to mercury 15% indium and 5% cadmium, then a very favorable result is obtained since the indium is not of influence on the cross-section for thermical neutrons, although the neutron capture in the epithermical region is increased appreciably.

What is claimed is:

1. In a nuclear reactor having a core containing fissile nuclear fuel and a cooling circuit for said core: at least one group of separate control tubes within said core, each of said tubes extending in a continuous upward direction and being closed at its upper end; means defining a common supply passage to which the lower ends of said control tubes are connected; a quantity of a neutron-absorbing liquid filling said supply passage and partially filling each of said control tubes; a quantity of gas contained within each of said control tubes between the closed end thereof and the surface of the neutron-absorbing liquid in the tube to provide a resilient gas cushion for said liquid; means for exerting a variable gas pressure on the liquid in said supply passage to force neutron-absorbing liquid into said control tubes against the gas cushions, the resilience of said gas cushions and the height of the closed upper ends of said control tubes being such that for a given pressure in said supply passage the levels of neutron-absorbing liquid in the different control tubes differ in a predetermined manner; a scram vessel containing high pressure gas and means for transmitting said high pressure gas to said supply passage, said transmitting means including a valved pipe leading from said scram vessel to one side of a burst diaphragm whose other side is exposed to the variable pressure acting on the liquid in said supply passage and means restraining rupture of said diaphragm by said variable gas pressure.

2. In a nuclear reactor having a core containing fissile nuclear fuel and a cooling circuit for said core: at least one group of separate control tubes within said core, each of said tubes extending in a continuous upward direction and being closed at its upper end; means defining a common supply passage to which the lower ends of said control tubes are connected; a quantity of a neutron-absorbing liquid filling said supply passage and partially filling each of said control tubes; a quantity of gas contained within each of said control tubes between the closed end thereof and the surface of the neutron-absorbing liquid in the tube to provide a resilient gas cushion for said liquid; at least one of said tubes having an enlarged internal diameter at a point along the length to compensate for a part of the reactor core which is under-moderated, means for pressurizing said supply passage to force neutron-absorbing liquid into said control tubes against the gas cushions, the resilience of said gas cushions and the height of the closed upper ends of said control tubes being such that for a given pressure in said supply passage the levels of neutron-absorbing liquid in the different control tubes differ in a predetermined manner.

3. A nuclear reactor as in claim 2 wherein said control tubes are subdivided by branching so that, in a horizontal cross section of the core, the proportion of neutron-absorbing surface to the corresponding fission surface is between 1:2 and 1:8.

4. In a control system for a nuclear reactor a core containing fissile material and control tubes in said core containing a liquid consisting of mercury, cadmium and thallium, said cadmium being present in an amount not more than 20 atom percent, said thallium being present in the amount of about 8 atom percent.

References Cited by the Examiner

UNITED STATES PATENTS 2,979,450  4/1961  Dusbabek ___________ 176—22
2,982,712  5/1961  Heckman ____________ 176—52

FOREIGN PATENTS 799,001  7/1958  Great Britain.
894,187  4/1962  Great Britain.
897,889  5/1962  Great Britain.
599,962  11/1959  Italy.

OTHER REFERENCES

Schmale, German application, 1,125,562, printed Mar. 15, 1962 (Kl. 21g, 21/31).

REUBEN EPSTEIN, *Primary Examiner.*

CARL D. QUARFORTH, *Examiner.*

M. R. DINNIN, *Assistant Examiner.*